US008695353B2

(12) United States Patent
Casasanta

(10) Patent No.: US 8,695,353 B2
(45) Date of Patent: Apr. 15, 2014

(54) ELECTROCALORIC COOLING

(75) Inventor: Vincenzo Casasanta, Woodinville, WA (US)

(73) Assignee: Empire Technology Development LLC, Wilmington, DE (US)

( * ) Notice: Subject to any disclaimer, the term of this patent is extended or adjusted under 35 U.S.C. 154(b) by 1087 days.

(21) Appl. No.: 12/641,153

(22) Filed: Dec. 17, 2009

(65) Prior Publication Data
US 2011/0146308 A1 Jun. 23, 2011

(51) Int. Cl.
*F25B 21/00* (2006.01)
(52) U.S. Cl.
USPC ............... 62/3.1; 62/3.2; 62/3.3; 62/3.6
(58) Field of Classification Search
USPC .................................... 62/3.1–3.3, 3.6
See application file for complete search history.

(56) References Cited

U.S. PATENT DOCUMENTS

| 2,734,344 | A | * | 2/1956 | Lindenblad | 62/3.2 |
| 3,638,440 | A | | 2/1972 | Lawless | |
| 4,136,525 | A | * | 1/1979 | Van Vechten | 62/3.1 |
| 4,407,133 | A | | 10/1983 | Edmonson | |
| 4,757,688 | A | | 7/1988 | Basiulis | |
| 5,522,215 | A | * | 6/1996 | Matsunaga et al. | 62/3.2 |
| 5,644,184 | A | * | 7/1997 | Kucherov | 310/306 |
| 7,308,008 | B2 | * | 12/2007 | Freeman et al. | 372/36 |
| 2003/0014980 | A1 | * | 1/2003 | Ono | 62/3.2 |
| 2007/0212920 | A1 | * | 9/2007 | Clayton et al. | 439/326 |
| 2008/0155992 | A1 | * | 7/2008 | Hodes et al. | 62/3.6 |
| 2008/0303375 | A1 | * | 12/2008 | Carver | 310/306 |
| 2010/0141914 | A1 | * | 6/2010 | Gilissen et al. | 355/53 |

FOREIGN PATENT DOCUMENTS

WO WO 2008044963 A2 * 4/2008

OTHER PUBLICATIONS

Mischenko, A.S., et al., "Giant Electrocaloric Effect in Thin-Film PbZr0.95Ti0.0503," Science, vol. 311, Issue 5765, pp. 1270-1271, (2006).
Lu, S.G. and Zhang Q., "Electrocaloric Materials for Solid State Refrigeration," Advanced Materials, vol. 21, Issue 19, pp. 1983-1987, May 18, 2009.
Neese B. et al., "Large Electrocaloric Effect in Ferroelectric Polymers Near Room Temperature," Science vol. 321, No. 5890, pp. 821-823, Aug. 8, 2008.
PCT/US2010/059049 Notification of International Search Report and Written Opinion; Feb. 7, 2011.

* cited by examiner

*Primary Examiner* — Allen Flanigan
*Assistant Examiner* — Johan Yavari
(74) *Attorney, Agent, or Firm* — Jensen & Puntigam, PS

(57) ABSTRACT

Techniques are generally described for devices for cooling using electrocaloric material as refrigerant and methods for cooling using electrocaloric material. An example cooling system may comprise a refrigerant unit having an electrocaloric membrane disposed between a heat sink and a cooling load. The electrocaloric membrane may alternate between thermal contact with the heat sink and cooling load. The electrocaloric membrane may also be subjected to alternating electric fields for polarizing and depolarizing the electrocaloric membrane in a manner that promotes heat transfer from the cooling load to the heat sink.

29 Claims, 8 Drawing Sheets

ELECTROCALORIC COOLING

BACKGROUND

Unless otherwise indicated herein, the materials described in this section are not prior art to the claims in this application and are not admitted to be prior art by inclusion in this section.

The electrocaloric effect (ECE) is a phenomenon in which a material shows a reversible entropy change under an applied electric field. Any material capable of producing ECE is referred to herein as an electrocaloric material. The entropy change in an electrocaloric material may correspond to a temperature change in the electrocaloric material in an adiabatic environment, or may cause the electrocaloric material to absorb or release heat from surroundings in diabatic environments. When an electric field is applied to an electrocaloric material, it induces a change in net electric polarization within the electrocaloric material, which leads to changes in entropy. The electrocaloric effect is characterized by entropy changes occurring with heat transfer in the electrocaloric material.

Electrocaloric materials have been a focus of scientific interest for several decades. Current literature discloses ECE in perovskite ferroelectric ceramics, which exhibit ECE most pronounced at their transition temperatures above 200° Celsius (° C.). In 2006, thin films of lead zirconate titanate (PZT) were reported to show ECE cooling of 12° C., with an electric field change of $4.8 \times 10^7$ volts/meter (V/m) at an operational temperature of around 220° C. (A. S. Mischenko et al., "Giant Electrocaloric Effect in Thin-Film PbZr0.95Ti0.05O3", *Science* 311 (2006) 1270-1271. In 2008, a ferroelectric copolymer of PVDF was shown to achieve around 12° C. at an operating temperature of 70° C. (Bret Neese, et al., "Large Electrocaloric Effect in Ferroelectric Polymers near Room Temperature", *Science* 321 (2008) 821-823; and S. G. Lu and Q. Zhang, "Electrocaloric Materials for Solid State Refrigeration", *Adv. Mater.* 21 (2009) 1-5.)

Techniques of the present disclosure may be utilized in cooling systems and other thermal transfer devices using electrocaloric materials. The present disclosure may provide further related advantages.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
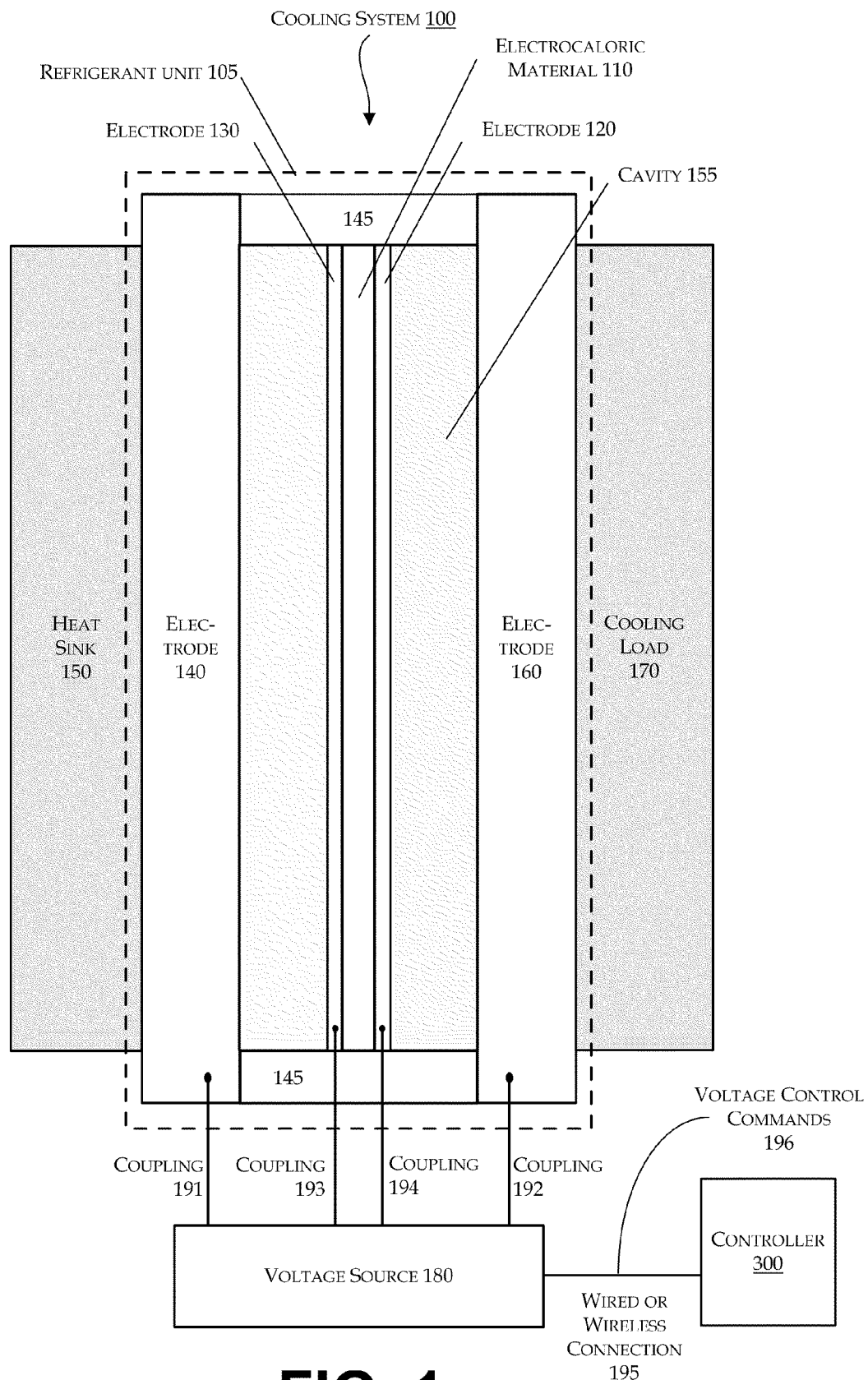
FIG. 1 is a schematic diagram of a representative cooling system.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and made part of this disclosure.

The present disclosure is generally drawn, inter alia, to methods, devices, and/or systems related to techniques for devices for cooling using electrocaloric material as a refrigerant and methods for cooling using electrocaloric material. An example cooling system may comprise a refrigerant unit having an electrocaloric membrane disposed between a heat sink and a cooling load. The electrocaloric membrane may alternate between thermal contact with the heat sink and cooling load. The electrocaloric membrane may also be subjected to alternating electric fields for polarizing and depolarizing the electrocaloric membrane in a manner that promotes heat transfer from the cooling load to the heat sink.

FIG. 1 is a schematic diagram of a representative cooling system that is arranged in accordance with at least some embodiments described herein. The example system 100 may include a refrigerant unit 105, voltage source 180, and controller 300. Refrigerant unit 105 may comprise a heat sink electrode 140, separators 145, cooling load electrode 160, cavity 155, electrocaloric material 110, and first and second electrode layers 120 and 130. FIG. 1 also illustrates a heat sink 150 and a cooling load 170, which may form an environment or part of a device into which the system 100 is inserted, or may be included as part of the system 100 in some embodiments.

In some embodiments, the refrigerant unit 105 may be configured for suspension between the heat sink 150 and cooling load 170. The heat sink electrode 140 and cooling load electrode 160 may be configured to form sidewalls of the cavity 155, and separators 145 may be configured as top and bottom walls of the cavity 155. The cooling system 100 may be configured to place heat sink electrode 140 in thermal communication with heat sink 150, and to place cooling load electrode 160 in thermal communication with cooling load 170.

In some embodiments, the electrocaloric material 110 may be configured intermediate the first electrode layer 120 and the second electrode layer 130. Electrocaloric material 110, first electrode layer 120, and second electrode layer 130 may be configured within the cavity 155. Electrocaloric material 110, first electrode layer 120, and second electrode layer 130 may be configured to alternate between thermal communication with the heat sink 150 (for example, via contact with heat sink electrode 140 as illustrated in FIG. 2) and thermal communication with the cooling load 170, for example, via contact with the cooling load electrode 160.

In some embodiments, the voltage source 180 may be configured to provide voltages to the first electrode layer 120, the second electrode layer 130, the heat sink electrode 140, and/or the cooling load electrode 160. Voltages may be provided via couplings 191, 192, 193, and 194. A controller 300 may be configured to control the voltage source 180, for example by sending voltage control commands 196 to the voltage source 180 via wired or wireless connection 195.

Figure 2:
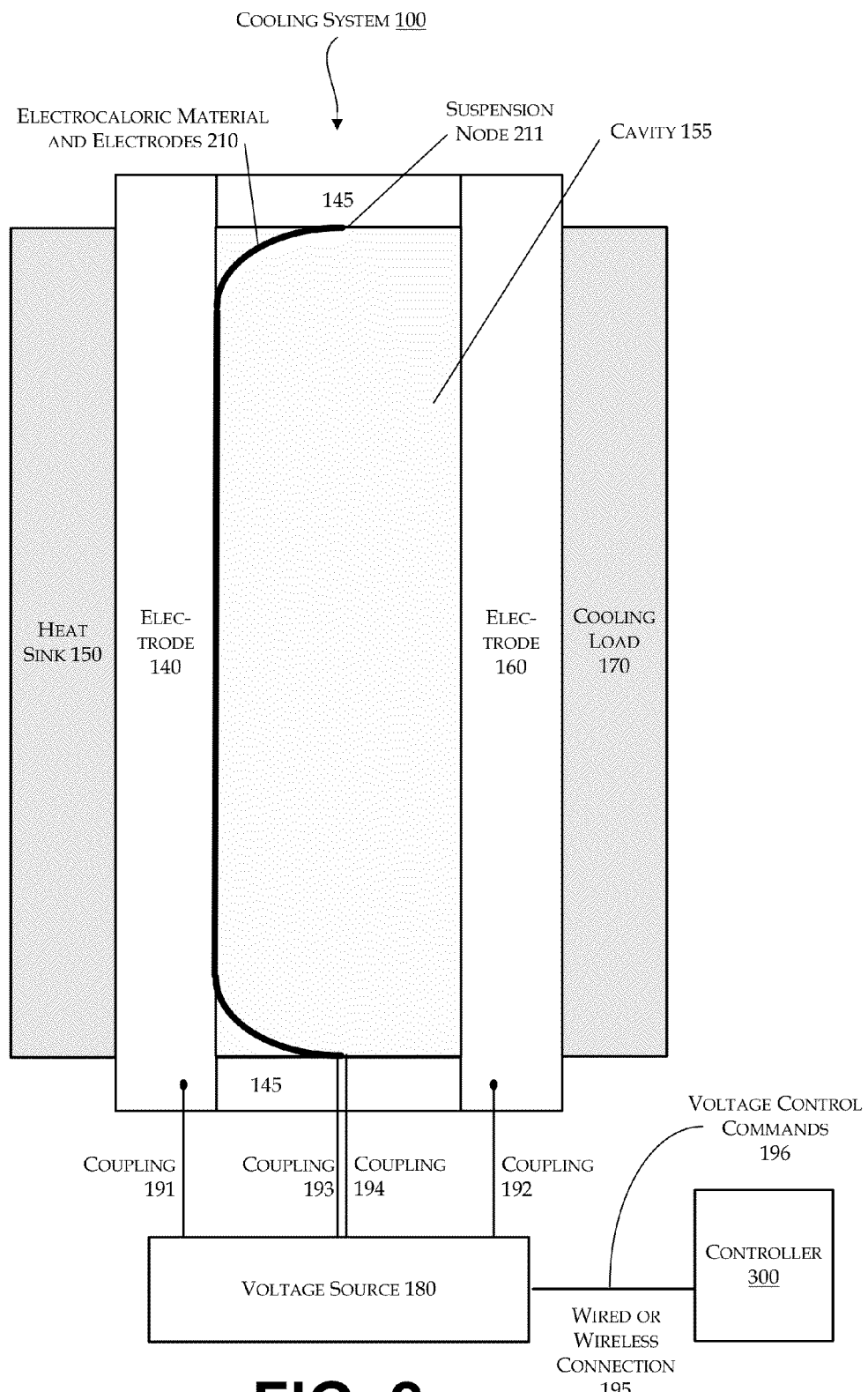
FIG. 2 is a schematic diagram of a representative cooling system with an electrocaloric material in thermal contact with a heat sink.

FIG. 2 is a schematic diagram of a representative cooling system with an electrocaloric material in thermal contact with a heat sink, arranged in accordance with at least some embodiments described herein. As in FIG. 1, FIG. 2 illustrates an example system 100 which may include a heat sink electrode 140, separators 145, cooling load electrode 160, cavity 155, voltage source 180 and controller 300. FIG. 2 illustrates electrocaloric material and electrodes 210 in the place of electrocaloric material 110, first and second electrode layers 120 and 130 illustrated in FIG. 1. FIG. 2 also illustrates a heat sink 150 and a cooling load 170.

FIG. 2 illustrates a cooling system 100 similar to that of FIG. 1, with like components identified by like identifiers. The electrocaloric material and electrodes 210 may provide a layered electrocaloric material and electrode structure corresponding to the electrocaloric material 110 and first and second electrode layers 120 and 130 illustrated in FIG. 1. In other words, the electrocaloric material and electrodes 210 may comprise a layered construction as illustrated for 110, 120, and 130 in FIG. 1. Electrocaloric material and electrodes 210 are illustrated in a combined and thinner-profile view in FIG. 2 for the purpose of illustrating flexibility of the electrocaloric material and electrodes 210 for thermal contact with heat sink electrodes 140 and/or 160 according to some embodiments.

The cooling systems 100 illustrated in FIG. 1 and FIG. 2 may be configured to cool the cooling load 170 in a thermal transfer cycle. A cooling system 100 may be configured to implement a first stage of a thermal transfer cycle by placing the electrocaloric material 110 in thermal communication with the cooling load 170 (also referred to herein as biasing the electrocaloric material 110 in thermal communication with the cooling load 170), removing a polarization voltage applied to the electrocaloric material 110, and waiting for a delay period for thermal communication of heat from the cooling load 170 to the electrocaloric material 110. Depolarizing the electrocaloric material 110 by removing the polarization voltage increases the entropy of the electrocaloric material 110, causing the electrocaloric material 110 to absorb heat from the cooling load 170. The cooling system 100 may be configured to proceed from the first stage of the thermal transfer cycle to a second stage.

The cooling system 100 may be configured to implement a second stage of a thermal transfer cycle by moving the electrocaloric material 110 out of thermal communication with the cooling load 170, placing the electrocaloric material 110 into thermal communication with the heat sink 150 (also referred to herein as biasing the electrocaloric material 110 in thermal communication with the heat sink 150), applying a polarization voltage to the electrocaloric material 110, and waiting for a delay period for thermal communication of heat from the electrocaloric material 110 to the heat sink 150. Polarizing the electrocaloric material 110 by applying a polarization voltage decreases entropy of the electrocaloric material 110, causing the electrocaloric material 110 to release heat into the heat sink 150. The cooling system 100 may be configured to repeat the thermal transfer cycle by returning to the first stage, namely, by again placing the electrocaloric material 110 in thermal communication with the cooling load 170, removing the polarization voltage, and so forth. Additional aspects and embodiments of techniques for operating a cooling system 100 are described herein with reference to FIG. 4 and FIG. 5.

The terms "bias source" and "bias device" are used herein to refer to apparatus configured to place an electrocaloric material in thermal communication with a heat sink and/or cooling load. Cooling system 100 may be configured with any of a variety of bias sources to bias the electrocaloric material and electrodes 210 from thermal communication with the heat sink 150 to thermal communication with the cooling load 170, and vice versa. In some embodiments, voltages may be applied to the electrodes 140, 160 in a configuration such as FIG. 2. The voltage between the second electrode 130 on the electrocaloric material 110 and the heat sink electrode 140 is denoted herein as $V_S$, and the voltage between the first electrode 120 on the electrocaloric material 110 and the cooling load electrode 160 is denoted herein as $V_L$. The voltages $V_S$ and $V_L$ may be applied in such a manner to move the electrocaloric material 210 in alternating thermal communication with the heat sink electrode 130 and cooling load electrode 140. The voltage that controls the electric polarization within the electrocaloric material 110 is denoted herein as $V_E$.

The cooling system 100 may be configured to bias the heat sink electrode 140 to bring the electrocaloric material and electrodes 210 into thermal communication with the heat sink electrode 140, wherein the heat sink electrode 140 is in thermal communication with the heat sink 150 as shown in FIG. 2. Conversely, the cooling system 100 may be configured to bias the cooling load electrode 160 to bring the electrocaloric material and electrodes 210 into thermal communication with the cooling load electrode 160, wherein the cooling load electrode 160 is in thermal communication with the cooling load 170. Additional aspects and embodiments of techniques for biasing electrode voltages for 140 and 160 as well as 120 and 130 are described herein with reference to FIG. 3.

Figure 8:
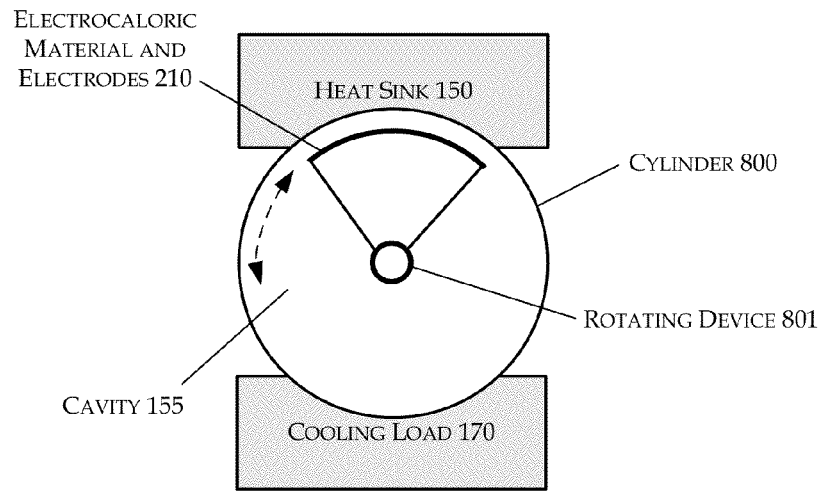
FIG. 8 is a schematic diagram of a top view of a representative cooling system equipped with a rotating device for biasing an electrocaloric membrane into alternate thermal communication with a heat sink and a cooling load.

In various alternative embodiments, a cooling system 100 may be configured to bias the electrocaloric material 110 from thermal communication with the heat sink 150 to thermal communication with the cooling load 170 using alternative configurations and bias sources as will be appreciated with the benefit of this disclosure. For example, bias sources may comprise, and motion may be facilitated by one or more of the following: a hinge device, a spring device, a slide device, and/or rotating device. In rotating bias device embodiments such as illustrated in FIG. 8, the electrocaloric material and electrodes 210 may be configured to rotate, by operation of a rotating device 801, about a vertical axis running through a cylinder 800. In rotating embodiments the cavity 155 may be cylindrical and the electrocaloric material and electrodes 210 may be configured as a portion of a cylinder, e.g., a half-cylinder that rotates within the cavity 155. Mechanical rotation of the electrocaloric material and electrodes 210 may eliminate the need for electrodes 140, 160.

Figure 9:
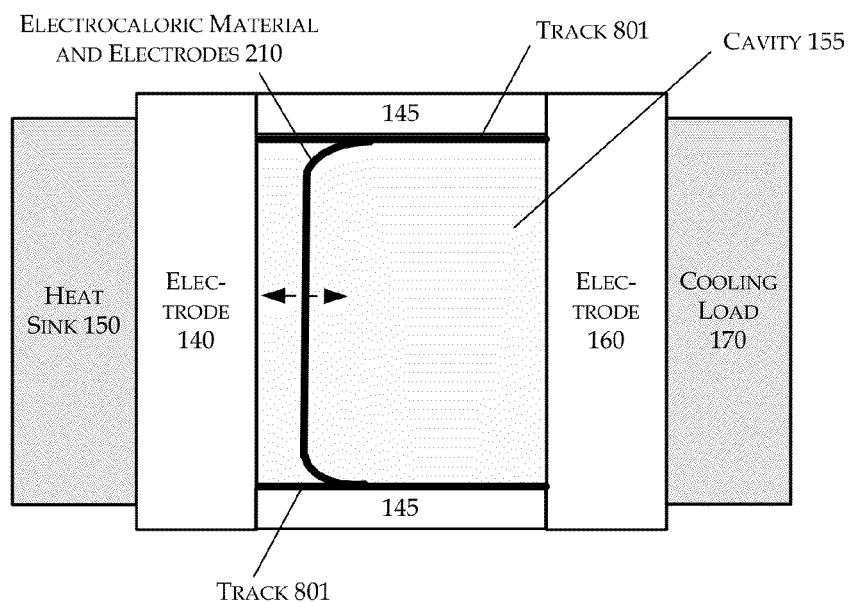
FIG. 9 is a schematic diagram of a representative cooling system equipped with a track to implement a slide device for biasing an electrocaloric membrane into alternate thermal communication with a heat sink and a cooling load; all arranged in accordance with at least some embodiments of the present disclosure.
Figure 6:
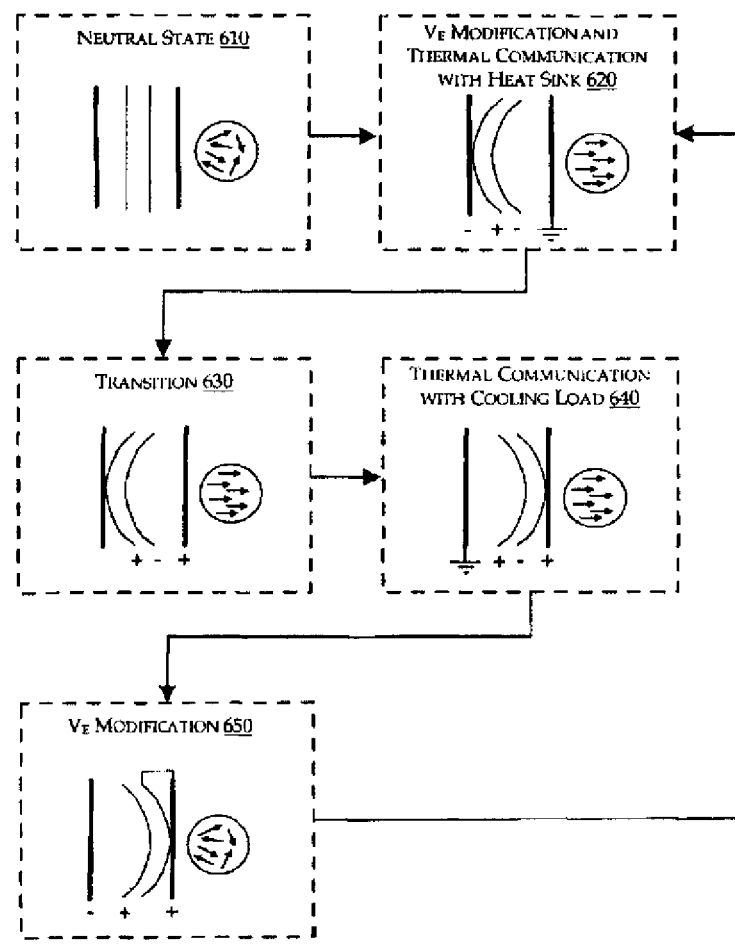

In sliding bias device embodiments such as illustrated in FIG. 9, the electrocaloric material and electrodes 210 may be configured as slidable between the electrodes 140, 160, e.g., along a track 801 or other structure disposed on the separators 145. A slidable electrocaloric material and electrode layers may employ a rigid structure as may be formed for example using ferroelectric ceramics, or a flexible electrocaloric material and electrodes 210 structure as shown in FIG. 2.

In some sliding bias device embodiments, the cooling system 100 may be configured to retain the electrocaloric material 110 and electrode layers 120, 130 in place, while alternatively moving the heat sink 150 and cooling load 170 into thermal communication with the electrocaloric material 110. For example, the cooling system 100 may be configured similarly to FIG. 1, while extending the separators 145 and employing a track or other structure on the separators 145 allowing heat sink 150, electrode 140, cooling load 170, and electrode 160 to alternatively slide in and out of thermal contact with the stationary electrocaloric material 110 and electrode layers 120, 130.

A wide variety of additional bias source configurations using for example springs, hinges and a variety of other structures may be configured by those of skill in the art with the benefit of this disclosure, as will be appreciated.

Surfaces of the heat sink electrode 140 and cooling load electrode 160, and/or surfaces of the first and second electrode layers 120 and 130 may be configured to comprise passivation layers. Passivation layers may be configured to prevent electrical contact between electrodes 140, 160 and electrode layers 120 and 130, for example when electrocaloric material and electrodes 210 may be brought into mechanical contact with heat sink electrode 140 as shown in FIG. 2. Passivation layers allow for thermal communication advantages of mechanical contact while offering dielectric separation during the contact. In some embodiments, sputter deposited thin films of beryllium oxide (BeO) or aluminum nitride (AlN) may be utilized as passivation layers. In some embodiments, the thickness of a passivation layer may range from about 10 nm to about 100 nm.

In some embodiments, the electrocaloric material 110 may be configured as a polymer film, which may display ferroelectric moments under the application of an electric field and an intrinsic and remnant polarization after the removal of the electric field. Modulation of ferroelectric moment may produce the increase and decrease in entropy properties useful for refrigeration. Electrocaloric materials useful in the present disclosure may include ferroelectric polymer materials, such as polyvinylidenefluoride (PVDF), its analogs, and copolymers, such as copolymers with other halogenated substitutes. For embodiments such as FIG. 2, any electrocaloric material having the flexible nature and therefore allowing the displacement of the electrocaloric material and electrodes 210 between the heat sink 150 and cooling load 170 may be used. In various other embodiments described herein, rigid, non-flexible electrocaloric materials may be used, such as ferroelectric ceramic materials including perovskite ceramics.

In some embodiments, electrocaloric material and electrodes 210 may be configured by depositing metal thin films on the surfaces of an electrocaloric polymer membrane. Metal thin films may be deposited for example using evaporative or sputter techniques. Metals for use in the metal thin films may be determined by desired adhesion, thermal performance, and/or wear resistance properties. Representative metals include aluminum, gold, silver, iron, copper, nickel, chromium, zinc, copper, and combinations thereof. The metal thin films may be configured to serve as electrodes capable of forming a capacitor across the electrocaloric polymer membrane, wherein the capacitor is configured to allow application of an electric field across the electrocaloric polymer membrane for polarization of the electrocaloric polymer membrane. In addition, the metal thin films may be configured to support electrostatic interactions between the metal thin film electrode layers and either the heat sink electrode 140 or the cooling load electrode 160, so that voltages applied to the electrodes 140 and 160 may be capable of capacitively driving the electrocaloric material and electrodes 210 to either the heat sink electrode 140 or the cooling load electrode 160.

In some embodiments, electrocaloric material and electrodes 210 may be configured with a selected thickness, wherein the selected thickness is based on one or more functional parameters. For example, the thickness of the electrocaloric material and electrodes 210 may affect the voltage required for polarization as well as the amount of heat which may be absorbed and released by the electrocaloric material and electrodes 210 in each iteration of a thermal transfer cycle. A thicker electrocaloric material and electrodes 210 structure may transfer more heat per iteration, and may involve higher polarizing voltages to achieve the appropriate electric field magnitudes.

Thickness of the electrocaloric material and electrodes 210 may also affect deformation properties of the electrocaloric material and electrodes 210. In embodiments configured for deformation of the electrocaloric material and electrodes 210 by application of electric fields, such as FIG. 2, the thickness of the electrocaloric material and electrodes 210 may be configured to allow sufficient deformation under applied electric fields produced by voltages applied between heat sink electrode 140 and electrode layer 130 and between cooling load electrode 160 and electrode layer 120. In some embodiments, the thickness of the electrocaloric material and electrodes 210 may range from about 0.5 microns to about 100 microns.

Other representative design factors, which may affect deformation of the electrocaloric material and electrodes 210 and, ultimately, the thickness of the electrocaloric material and electrodes 210, may include one or more of the following: elastic modulus of the electrocaloric material 110, storage and loss modulus of the electrocaloric material 110, elastic limit and/or plasticity zone of the electrocaloric material 110, the vacuum maintained in the cavity 155, available system voltage and power, distance between the heat sink electrode 140 and the cooling load electrode 160, overall capacitance between the metal thin film electrodes 120 and 130, and the heat sink electrode 140 and/or cooling load electrode 160, and/or the interior passivation dielectric constant and thickness on the heat sink electrode 140, the cooling load electrode 160, and/or the metal thin film electrode layers 120 and 130.

Additionally, the thickness of the electrocaloric material 110 may be selected based in part on the magnitude, direction, and distribution of the externally applied electric field produced in the electrocaloric material 110 by the metal thin film electrodes 120 and 130. For example, a thicker electrocaloric material 110 may be selected for use with a stronger voltage, and vice versa. The strength of the electric field may vary with available system voltages, so in some embodiments the thickness of the electrocaloric material 110 may be selected based on available system voltages.

The electric field produced in the electrocaloric material 110 will be a function of a voltage designated as $V_E$ which is applied across the metal thin film electrode layers 120 and 130. $V_E$ and/or electrocaloric material 110 thickness may be selected to sufficiently polarize the electrocaloric material 110 to electret saturation in each iteration of a thermal transfer cycle. For example, a polyvinylidenefluoride (PVDF) membrane may reach desired polarization levels under applied fields in the range of about $10^8$V/m. Thus a 10 micron thick PVDF electrocaloric material 110 may reach a desired polarization level by applying about 1000V across 120 and 130.

Other factors which may be used to select electrocaloric material 110 thickness in some embodiments may include one or more of the following: ferroelectric saturation polarization field of the electrocaloric material 110, pyroelectric coefficient of the electrocaloric material 110, and/or piezoelectric coefficient of the electrocaloric material 110. In some embodiments, the thickness of the electrocaloric material 110 may be from about 0.5 microns to about 100 microns.

In some embodiments, the electrocaloric material and electrodes 210 may be configured to be suspended by two edges to form an electrocaloric structure resembling a rectangular sail (or sail of another shape, depending on the shape of the cavity 155 and desired shape of the electrocaloric material and electrodes 210) attached to either the separators 145 at the edges proximal to the separators 145, or attached to front and back sidewalls (not shown) at edges proximal to the sidewalls. Alternatively, the electrocaloric material and electrodes 210 may be suspending by one edge to form an electrocaloric structure resembling a rectangular (or other cavity 155 shape) flap. Also, in some embodiments, the electrocaloric material and electrodes 210 may be suspended by all edges to form an electrocaloric structure resembling a drumhead. Suspension nodes 211 may be constructed on the separators 145 and/or front and back sidewalls of the refrigerant unit 105, and may be constructed of a thermally and electrically insulating material. Representative suspension node material includes rigid polymers, such as polyurethane, polyethylene, polyvinyl chloride, and polypropylene, and ceramic. Suspension node structures such as hinges and springs may also be used in some embodiments.

In some embodiments, the heat sink electrode 140 and the cooling load electrode 160 in may be configured to comprise various metallic compositions. The electrodes 140 and 160 may comprise electrical conductor materials having thermal conductivity above 10 W/m-K. Representative materials include aluminum, copper, steel and combinations thereof. In some embodiments, the electrodes 140 and 160 may comprise low expansion alloys, for example, alloys having a Coefficient of Thermal Expansion (CTE) of approximately $10^6$ ppm/K that are used in electronics packaging applications. Representative alloys useful in this regard include, but are not limited to, Ni—Fe alloy 42 and Kovar. The thickness of the electrodes 140 and 160 may range from approximately 100 μm to approximately 5 mm.

In some embodiments, the surface of the cooling load electrode 160 opposite the cavity 155 may be adapted to be in thermal communication with a cooling load 170. The cooling load 170 may be any device or structure that needs to be cooled. The surface of the heat sink electrode 140 opposite the cavity 155 may be adapted to be in thermal communication with a heat sink 150. Representative heat sinks 150 include a finned aluminum and/or copper block. The surfaces of electrodes 140 and 160 opposite the cavity 155 can retain their metallic character to effectively transfer thermal energy to and from the heat sink 150 and cooling load 170 respectively. Additionally, the surfaces opposite the cavity 155 may conform to the shape of cooling load 170 and heat sink 150 configurations.

The surfaces of the electrodes 140 and 160 facing the cavity 155 may be planar or curved as needed. In the representative embodiment 100, these surfaces are planar and compose a parallel plate capacitor. The surfaces of the electrodes 140 and 160 facing the cavity 155 may possess thin passivation layers as described above, which may allow mechanical contact between electrocaloric material and electrodes 210 and electrodes 140 and 160, and corresponding thermal communication advantages, while simultaneously supporting dielectric separation of electrocaloric material and electrodes 210 and electrodes 140 and 160.

In some embodiments, the separators 145 can support the electrodes 140 and 160 and can provide suspension points for the electrocaloric material and electrodes 210. The separators 145 may comprise any electrically and/or thermally insulating material. Representative separator materials can include rigid polymers, such as polyurethane, polyethylene, polyvinyl chloride, and polypropylene, and ceramic. In some embodiments, a ceramic ring frame with a metalized seal ring may be used to separate the heat sink electrode 140 and cooling load electrode 160. The separators 145 may resemble a thin ceramic seal ring frame commonly used in semiconductor or hybrid electronics packaging and may furthermore be able to maintain a hermetic seal as described herein.

In some embodiments, a refrigerant unit 105 may be configured to support a vacuum in the cavity 155. Ambient air may be evacuated from the cavity 155 so that the electrocaloric material 110 and electrode layers 120, 130 may be effectively drawn to the electrodes 140 and 160 using an electrostatic/capacitive drive or other structure as described herein. Ionization and drag of internal gases in cavity 155 may provide negative effects limiting the motion of the electrocaloric material and electrodes 210 for a given capacitance, and a vacuum in cavity 155 can prevent such negative effects. Absence of internal gases in cavity 155 may also prevent arcing between electrode layers 120, 130 and electrodes 140 and 160 that may affect the operation of the cooling system 100.

A vacuum on the order of 1 mTorr may be produced by a mechanical roughing pump. For example, air can be pumped from the cavity 155 using an orifice inlet and tip-off valve in a sidewall of the refrigerant unit 105. The cooling system 100 may include a vacuum pump to restore a vacuum in the cavity 155 as necessary. Alternatively, a refrigerant unit 105 of the present disclosure may be assembled in a vacuum reflow station or seam seal glove box, similar to techniques employed for establishing vacuums in the electronics packaging industry. For example, the electrodes 140 and 160 may be sealed to a frame seal ring in a vacuum chamber or glove box using laser or seam sealing techniques.

Figure 3:
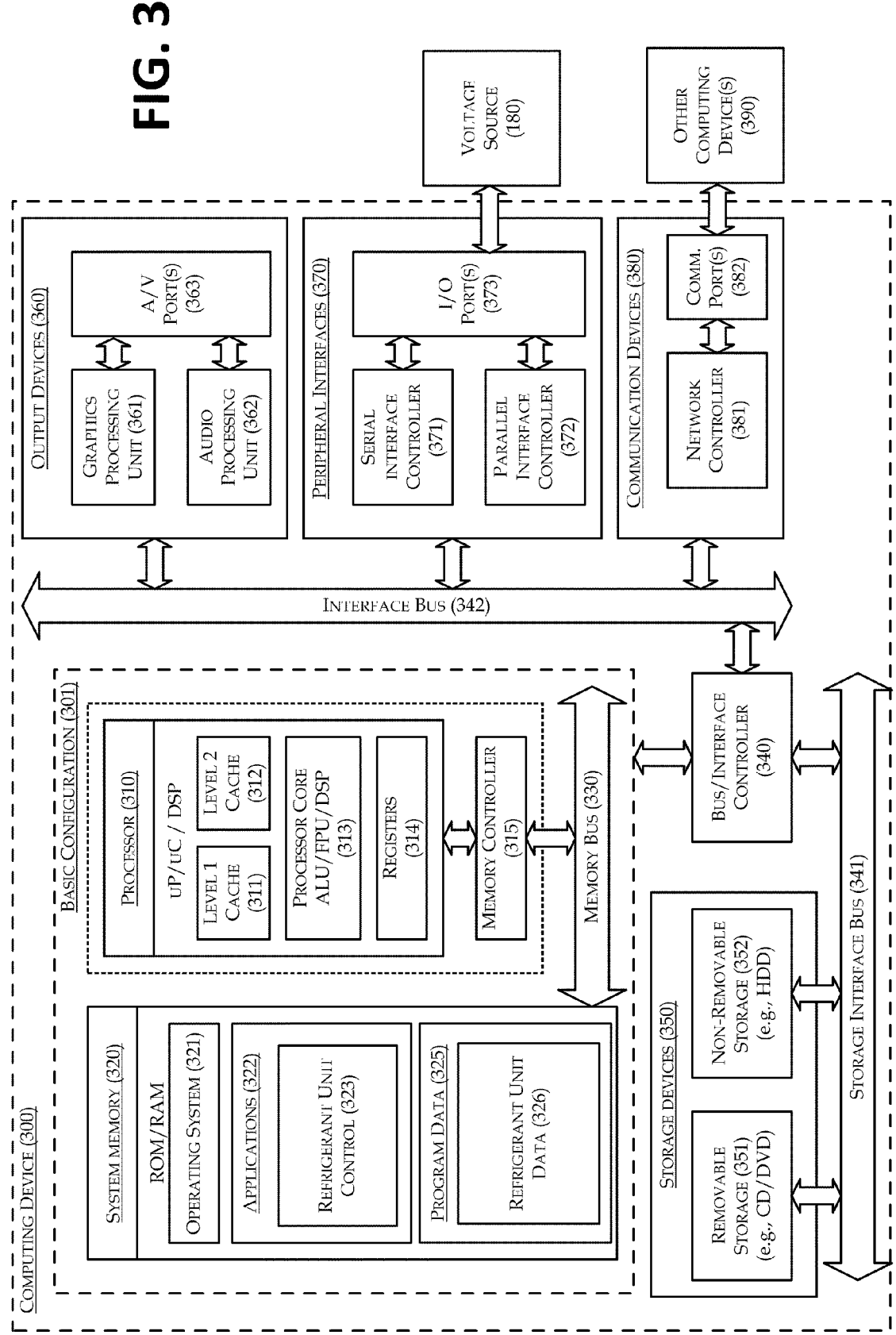
FIG. 3 is a block diagram of a representative computing device configured for controlling a cooling system.

FIG. 3 is a block diagram of a representative computing device configured for controlling a cooling system, arranged in accordance with at least some embodiments of the present disclosure. Computing device 300 provides an example of a controller 300 as illustrated in FIG. 1 and FIG. 2. In a very basic configuration 301, computing device 300 may include one or more processors 310 and system memory 320. A memory bus 330 may be used for communicating between the processor 310 and the system memory 320.

Depending on the desired configuration, processor 310 may be of any type including but not limited to a microprocessor (μP), a microcontroller (μC), a digital signal processor (DSP), or any combination thereof. Processor 310 may include one or more levels of caching, such as a level one cache 311 and a level two cache 312, a processor core 313, and registers 314. The processor core 313 may include an arithmetic logic unit (ALU), a floating point unit (FPU), a digital signal processing core (DSP Core), or any combination thereof. A memory controller 315 may also be used with the processor 310, or in some implementations the memory controller 315 may be an internal part of the processor 310.

Depending on the desired configuration, the system memory 320 may be of any type including but not limited to volatile memory (such as RAM), non-volatile memory (such as ROM, flash memory, etc.), or any combination thereof. System memory 320 typically includes an operating system 321, one or more applications 322, and program data 325. Applications 322 may include, for example, refrigerant unit control module(s) 323. Program data 325 may include refrigerant unit data 326 that may be used by module(s) 323.

Refrigerant unit control module(s) 323 may be configured to control a voltage source 180 to implement a thermal transfer cycle as described herein. In some embodiments, refrigerant unit control module(s) 323 may be configured to implement methods according to FIG. 4 and FIG. 5. For example, refrigerant unit control module(s) 323 may supply voltage control commands 196 to a voltage source 180 via a wired or wireless connection 195. The voltage control commands 196 may be received and implemented at the voltage source 180 by applying voltages to couplings 191, 192, 193, and 194 at voltage levels and at timing intervals according to the voltage control commands 196. The voltage control commands 196 may implement a thermal transfer cycle as described above or as described with reference to FIG. 4 and/or FIG. 5.

In some embodiments, the refrigerant unit control module(s) 323 may adaptively configure voltage control commands 196 according to program data 325. For example, program data 325 may specify a current temperature of the cooling load 170 and a desired target temperature of the cooling load 170, and the voltage control commands 196 may increase or decrease a rate of thermal transfer applied at the refrigerant unit 105 in response to the current temperature, the desired target temperature, or both.

Computing device 300 may have additional features or functionality, and additional interfaces to facilitate communications between the basic configuration 301 and any required devices and interfaces. For example, a bus/interface controller 340 may be used to facilitate communications between the basic configuration 301 and one or more data storage devices 350 via a storage interface bus 341. The data storage devices 350 may be removable storage devices 351, non-removable storage devices 352, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives, to name a few. Example computer storage media may include volatile and nonvolatile, removable and non-removable media implemented in any method or technology for storage of information, such as computer readable instructions, data structures, program modules, or other data.

System memory 320, removable storage 351, and non-removable storage 352 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that may be used to store the desired information and that may be accessed by computing device 300. Any such computer storage media may be part of device 300.

Computing device 300 may also include an interface bus 342 for facilitating communication from various interface devices (e.g., output interfaces, peripheral interfaces, and communication interfaces) to the basic configuration 301 via the bus/interface controller 340. Example output devices 360 include a graphics processing unit 361 and an audio processing unit 362, which may be configured to communicate to various external devices such as a display or speakers via one or more A/V ports 363.

Example peripheral interfaces 370 may include a serial interface controller 371 or a parallel interface controller 372, which may be configured to communicate through either wired or wireless connections with external devices such as voltage source 180 via one or more I/O ports 373. Other external devices may include input devices (e.g., keyboard, mouse, pen, voice input device, touch input device, etc.) or other peripheral devices (e.g., printer, scanner, etc.).

An example communications device 380 includes a network controller 381, which may be arranged to facilitate communications with one or more other computing devices 390 over a network communication via one or more communication ports 382.

The computer storage media may be one example of a communication media. Communication media may typically be embodied by computer readable instructions, data structures, program modules, or other data in a modulated data signal, such as a carrier wave or other transport mechanism, and include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR), and other wireless media.

Computing device 300 may be implemented as a portion of a small-form factor portable (or mobile) electronic device such as a cell phone, a personal data assistant (PDA), a personal media player device, a wireless web-watch device, a personal headset device, an application-specific device, or a hybrid device that include any of the above functions. Computing device 300 may also be implemented as a personal computer including both laptop computer and non-laptop computer configurations. Furthermore, in some embodiments a controller 300 may be implemented as a microcontroller, an Application Specific Integrated Circuit (ASIC), or other electronic control device. In some embodiments, the controller 300 may be implemented inside the voltage source 180 and vice-versa.

Figure 4:
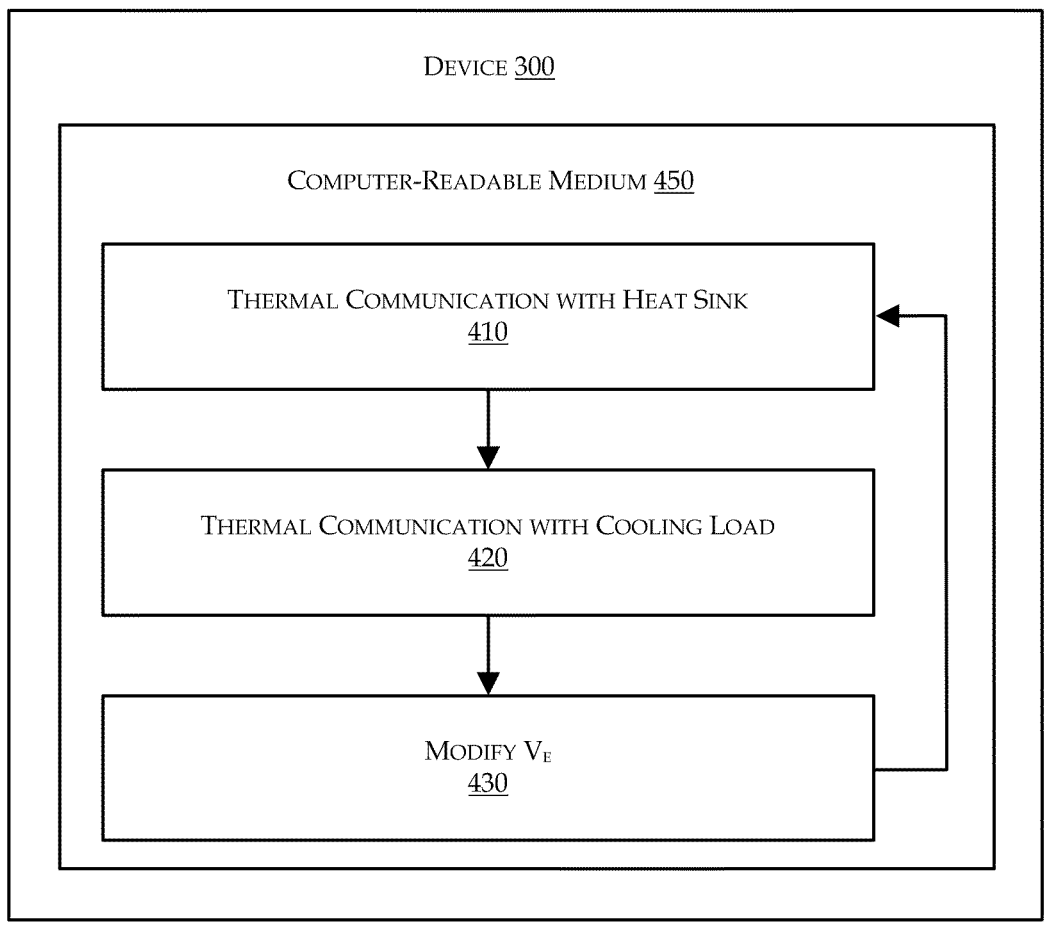
FIG. 4 is a flow diagram illustrating an example process for operating a cooling system.

FIG. 4 is a flow diagram illustrating an example process for operation of a cooling system, arranged in accordance with at least some embodiments of the present disclosure. FIG. 4 illustrates a process that may be performed by a cooling system 100 under the control of a device such as a controller 300 or combined voltage source 180 and controller 300. The example process may include one or more operations/modules as illustrated by blocks 410-430, which represent operations as may be performed in a method, functional modules in a device 300, and/or instructions as may be recorded on a computer readable medium 450. The illustrated blocks 410-430 may be arranged to provide functional operations including one or more of "Thermal Communication with Heat Sink" at block 410, "Thermal Communication with Cooling Load" at block 420, and/or "Modify $V_E$" at block 430.

In FIG. 4, blocks 410-430 are illustrated as being performed sequentially, with block 410 first and block 430 last. It will be appreciated however that these blocks may be re-ordered as convenient to suit particular embodiments, and that these blocks or portions thereof may be performed concurrently in some embodiments. It will also be appreciated that in some examples various blocks may be modified or eliminated, divided into additional blocks, and/or combined with other blocks.

Figure 5:
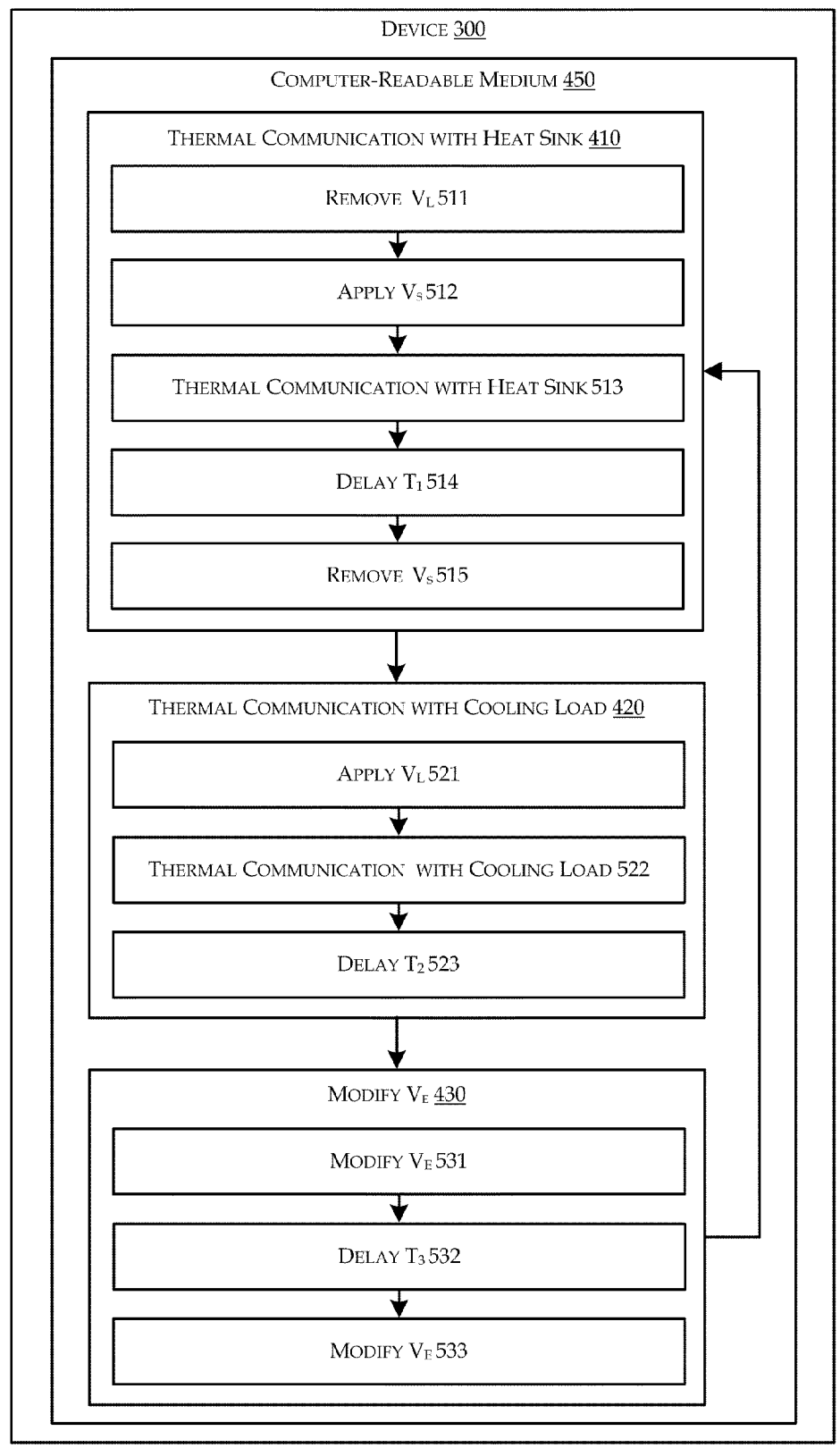
FIG. 5 is a flow diagram illustrating additional aspects of an example process for operating a cooling system.

FIG. 4 illustrates an example process by which a thermal transfer cycle may be implemented to transfer heat from a cooling load to a heat sink. In general, the process may comprise alternating thermal communication of an electrocaloric material 110 between a heat sink 150 and a cooling load 170, and a cyclic polarizing voltage $V_E$ applied to the electrocaloric material 110 to produce a desired cooling effect. FIG. 4 provides a general description of an example process and FIG. 5 provides a detailed view of one embodiment of the general process.

In a "Thermal Communication with Heat Sink" block 410, an electrocaloric material 110 and a heat sink 150 may be placed in thermal communication. Thermal communication may be via any number of layers disposed between the electrocaloric material 110 and heat sink 150, including for example electrode layers such as 120 and 140, and corresponding passivation layers. In some embodiments, thermal communication may be implemented via a fan or pump for flowing a gas or liquid over a layer such as 140, where the gas or liquid serves as a thermal conductor to the electrocaloric material 110.

In some embodiments, placing electrocaloric material 110 and heat sink 150 in thermal communication may comprise moving the electrocaloric material 110 to the heat sink 150 as described in connection with FIG. 5. However, the electrocaloric material 110 and/or heat sink 150 may also be moved using alternative configurations as described herein, and in some embodiments may not be moved, e.g., where a fan or pump is used to flow gas or liquid over a layer such as electrocaloric material 110. Block 410 may be followed by block 420.

In a "Thermal Communication with Cooling Load" block 420, an electrocaloric material 110 and a cooling load 170 may be placed in thermal communication. Thermal communication may be via any number of layers as described with reference to block 410, and electrocaloric material 110 and a cooling load 170 may be placed in thermal communication by moving the electrocaloric material 110 or using alternative configurations as described with reference to block 410. Block 420 may be followed by block 430.

In a "Modify $V_E$" block 430, a polarizing voltage $V_E$ applied across the electrocaloric material 110 may be modified. In some embodiments, $V_E$ may be modified by adjusting the voltages across electrode layers 120 and 130 using a voltage source 180 and controller 300 configuration as illustrated in FIG. 1 and FIG. 2.

In some embodiments, $V_E$ may be modified two times per thermal transfer cycle. A first $V_E$ modification may reduce net polarization, and a second $V_E$ modification may increase a net polarization. The timing of $V_E$ modification may be appropriately synchronized with operations of blocks 410 and 420. In some embodiments, both $V_E$ modifications may be carried out in a third block of a sequence as shown in FIG. 4, which embodiment is further described in connection with FIG. 5. In some embodiments, the $V_E$ modifications may be carried out at other points in a thermal transfer cycle, such as described in the thermal transfer cycle introduced with reference to FIG. 1 and FIG. 2, which provided a two stage cycle wherein a first stage comprises placing the electrocaloric material 110 in thermal communication with the cooling load 170 and removing a polarization voltage applied to the electrocaloric material 110, and a second stage comprises placing the electrocaloric material 110 in thermal communication with the heat sink 150 and applying a polarization voltage to the electrocaloric material 110.

FIG. 5 is a flow diagram illustrating additional aspects of an example process for operation of a cooling system, arranged in accordance with at least some embodiments of the present disclosure. FIG. 5 illustrates a detailed view of some embodiments according to the above description of FIG. 4, with like elements identified by like identifiers. The example process may include one or more operations/modules as illustrated by blocks 410-430, wherein block 410 may comprise blocks 511-515, block 420 may comprise blocks 521-523, and block 430 may comprise blocks 531-533. As with FIG. 4, the illustrated blocks in FIG. 5 represent operations as may be performed in a method, functional modules in a device 300, and/or instructions as may be recorded on a computer readable medium 450. Block 410, "Thermal Communication with Heat Sink" may be arranged to provide functional operations including one or more of "Remove $V_L$" at block 511, "Apply $V_S$" at block 512, "Thermal Communication with Heat Sink" at block 513, "Delay $T_1$" at block 514, and/or "Remove $V_S$" at block 515. Block 420, "Thermal Communication with Cooling Load" may be arranged to provide functional operations including one or more of "Apply $V_L$" at block 521, "Thermal Communication with Cooling Load" at block 522, and/or "Delay $T_2$" at block 523. Block 430, "Modify $V_E$" may be arranged to provide functional operations including one or more of "Modify $V_E$" at block 531, "Delay $T_3$" at block 532, and/or "Modify $V_E$" at block 533.

As with FIG. 4, the blocks of FIG. 5, including 410-430 and 511-515, 521-523, and 531-533 are illustrated as being performed sequentially, with the blocks of 410 first and the blocks of 430 last. It will be appreciated however that these blocks may be re-ordered as convenient to suit particular embodiments, and that these blocks or portions thereof may be performed concurrently in some embodiments. It will also be appreciated that in some examples various blocks may be modified or eliminated, divided into additional blocks, and/or combined with other blocks.

Figure 6:
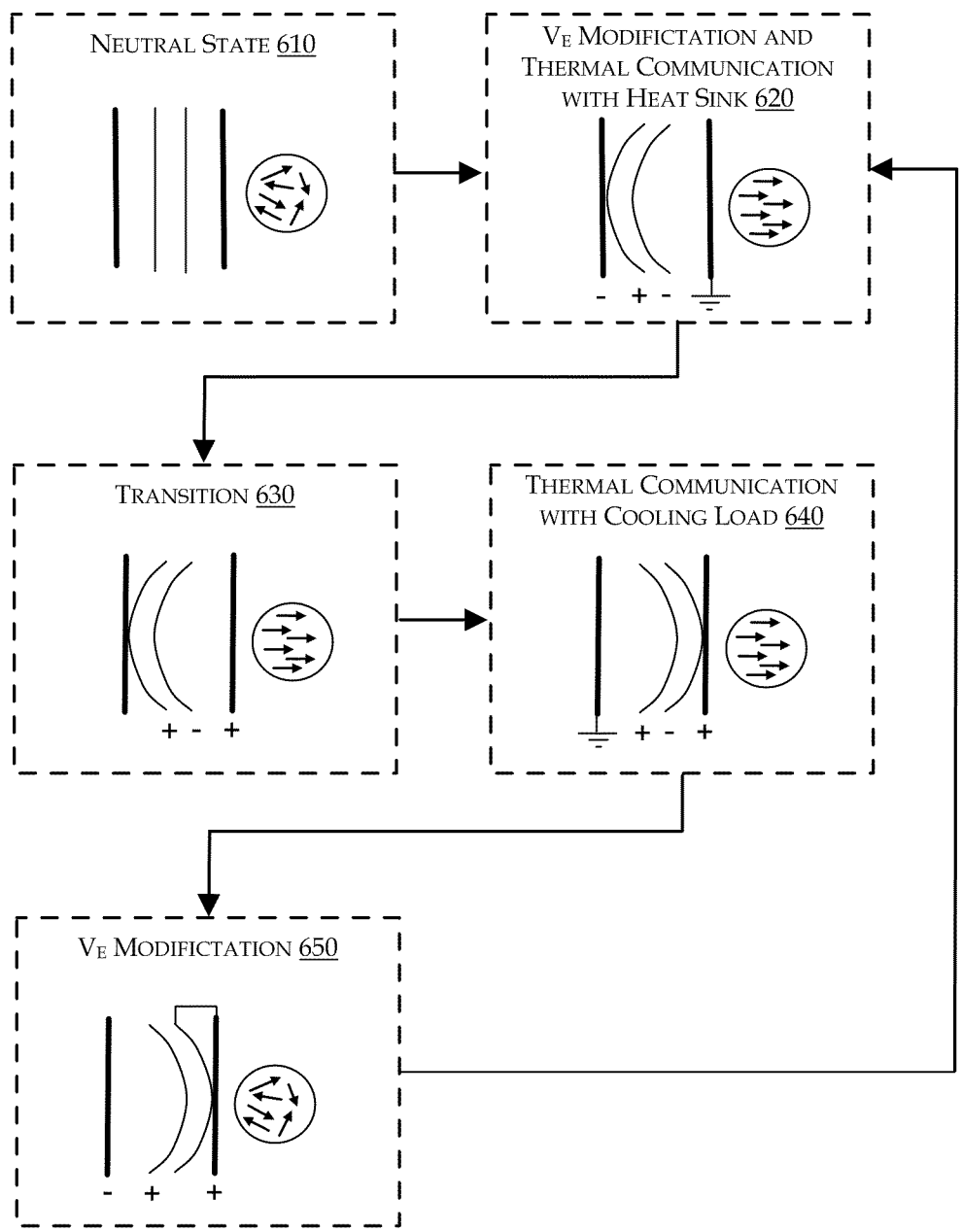
FIG. 6 is a flow diagram illustrating cooling system configuration transitions along with electrocaloric material entropy transitions during an example operation of a cooling system.

FIG. 5 may be better understood in conjunction with FIG. 6, which illustrates the entropy change of an electrocaloric material 110 during the operation of a representative cooling system 100. As shown in FIGS. 5 and 6, the motion and polarization of the electrocaloric material 110 may be controlled by three separate potentials with various bias. As noted above, a voltage that draws the electrocaloric material 110 towards the heat sink electrode 140 is denoted as $V_S$ and a voltage that draws the electrocaloric material 110 to the cooling load electrode 160 is denoted as $V_L$. A voltage that controls the polarization for the electrocaloric material 110 is denoted at $V_E$. An example sequence and bias arrangement that produces refrigeration is illustrated in FIG. 5.

The "Thermal Communication with Heat Sink" block 410 may comprise a "Remove $V_L$" block 511, an "Apply $V_S$" block 512, a "Thermal Communication with Heat Sink" block 513, a "Delay $T_1$" block 514, and/or a "Remove $V_S$" block 515. In the "Remove $V_L$" block 511, a voltage $V_L$ applied to a cooling load electrode 160 may be removed. Removing $V_L$ allows an electrocaloric material and electrodes 210 to move away from cooling load electrode 160. Block 511 may be followed by block 512.

In an "Apply $V_S$" block 512, device 300 may be configured to produce a voltage control command to forward bias a heat sink electrode 140 with a voltage $V_S$. $V_S$ may apply an electrical field in the cavity 155 sufficient to draw the electrocaloric material and electrodes 210 to thermal communication with the heat sink electrode 140. $V_S$ may be applied for as long as needed to displace the electrocaloric material and electrodes 210 to a desired position. Once the electrocaloric material and electrodes 210 have reached a desired position, $V_S$ may be removed, or $V_S$ may continue to be applied until removed as discussed below. Block 512 may be followed by block 513.

In a "Thermal Communication with Heat Sink" block 513, the electrocaloric material and electrodes 210 begin to release heat into the heat sink 150. The heat release may result in part from temperature differences between the electrocaloric material and electrodes 210 and heat sink 150, and may result in part from the polarization induced by the application of a polarization voltage $V_E$ as described below.

In a "Delay $T_1$" block 514, device 300 may be configured to produce a voltage control command to maintain $V_S$ for a period delay $T_1$. $T_1$ may be any desired time for thermal communication with heat sink 150. In some embodiments, $T_1$ may comprise a length of time sufficient for the electrocaloric material 110 to substantially reach saturation polarization and thermal equilibrium with the heat sink 150. Block 514 may be followed by block 515.

In a "Remove $V_S$" block 515, device 300 may be configured to produce a voltage control command to reverse bias $V_S$, in order to allow the electrocaloric material and electrodes 210 to be moved to into thermal communication with the cooling load 170. In some embodiments, the voltage source 180 may ground the heat sink electrode 140 by grounding coupling 191. Block 515 may be followed by block 420.

The "Thermal Communication with Cooling Load" block 420 may comprise an "Apply $V_L$" block 521, a "Thermal Communication with Cooling Load" block 522, and/or a "Delay $T_2$" block 523.

In an "Apply $V_L$" block 521, device 300 may be configured to produce a voltage control command to forward bias a cooling load electrode 160 with a voltage $V_L$. $V_L$ may apply an electrical field in the cavity 155 sufficient to draw the electrocaloric material and electrodes 210 to thermal communication with the cooling load electrode 160. $V_L$ may be applied for as long as needed to displace the electrocaloric material and electrodes 210 to a desired position. Once the electrocaloric material and electrodes 210 have reached a desired position, $V_L$ may be removed, or $V_L$ may continue to be applied until removed as discussed below. Block 521 may be followed by block 522.

In a "Thermal Communication with Cooling Load" block 522, the electrocaloric material and electrodes 210 begin to absorb heat from the cooling load 170. The absorption may result in part from temperature differences between the electrocaloric material and electrodes 210 and cooling load 170, and in part from the depolarization that occurs after removal of the polarizing voltage as described below. Block 522 may be followed by block 523.

In a "Delay $T_2$" block 523, device 300 may be configured to produce a voltage control command to maintain $V_L$ for a period delay $T_2$. $T_2$ may be any desired time for a first phase of thermal communication with cooling load 170. In some embodiments, $T_2$ may comprise a length of time sufficient for the electrocaloric material 110 in a polarized state in which $V_E$ may be constantly maintained to substantially reach thermal equilibrium with the cooling load 170 through the cooling load electrode 160. Block 523 may be followed by block 430.

The "Modify $V_E$" block 430, may comprise a "Modify $V_E$" block 531, a "Delay $T_3$" block 532, and/or a "Modify $V_E$" block 533. In a "Modify $V_E$" block 531, device 300 may be configured to produce a voltage control command to reduce or remove the bias $V_E$ so as to allow the electrocaloric material 110 to depolarize by the absorption of heat from the cooling load 170 and thereby increasing the entropy of the electrocaloric material 110. Block 531 may be followed by block 532.

In a "Delay $T_3$" block 532, device 300 may be configured to produce a voltage control command to maintain $V_L$ and/or a floating, or reduced, $V_E$ state for a period delay $T_3$. $T_3$ may be any desired time for a second phase of thermal communication with cooling load 170. In some embodiments, $T_3$ may comprise a length of time sufficient for the electrocaloric material 110 to absorb heat from the cooling load by depolarization whereby $V_E$ may be removed and the electrocaloric material 110 is allowed to substantially reach depolarization in thermal equilibrium with the cooling load 170 through the cooling load electrode 160. Depolarization of the electrocaloric material 110 occurs since the electrocaloric material 110 absorbs thermal energy from the cooling load 170 through the cooling load electrode 160. This leads to the cooling of the cooling load 170 and the increase of the entropy of the electrocaloric material 110. Block 532 may be followed by block 533.

In a "Modify $V_E$" block 533, device 300 may be configured to produce a voltage control command to bias $V_E$ so as to polarize and thereby decrease entropy of the electrocaloric material 110. Block 533 may be immediately followed by and/or performed substantially simultaneously with blocks 511 and 512 whereby the heat sink electrode 140 is forward biased, and the electrocaloric material and electrodes 210 are again drawn to the heat sink electrode 140, to repeat the thermal transfer cycle.

FIG. 6 is a flow diagram illustrating cooling system configuration transitions along with electrocaloric material entropy transitions during an example operation of a cooling system, arranged in accordance with at least some embodiments of the present disclosure. FIG. 6 illustrates a process that may be performed by a cooling system 100 under the control of a device 300 such as a controller 300 or combined voltage source 180 and controller 300. The example process may implement the various device and electrocaloric material transitions illustrated by blocks 610-650. The illustrated blocks 610-650 may be arranged to provide functional operations including one or more of "Neutral State" at block 610, "$V_E$ Modification and Thermal Communication with Heat Sink" at block 620, "Transition" at block 630, "Thermal Communication with Cooling Load" at block 640, and/or "$V_E$ Modification" at block 650.

In FIG. 6, blocks 610-650 are illustrated as being performed sequentially, with block 610 first and block 650 last. It will be appreciated however that these blocks may be re-ordered as convenient to suit particular embodiments, and that these blocks or portions thereof may be performed concurrently in some embodiments. It will also be appreciated that in some examples various blocks may be modified or eliminated, divided into additional blocks, and/or combined with other blocks.

FIG. 6 illustrates example device and electrocaloric material entropy transitions during an example operation of a cooling system as may be understood with reference to FIG. 5. In a "Neutral State" block 610, the electrocaloric material 110 may be maintained in a neutral unbiased state, where the net polarization is in a high state of disorder or higher entropy. The heat sink electrode 140 is illustrated on the left side of block 610, while the cooling load electrode 160 is illustrated on the right side, and electrodes 120 and 130 are shown intermediate the electrodes 140 and 160. A representation of the ferroelectric polarization, with higher and lower entropy states of the electrocaloric material 110 is shown to the right of the cooling load electrode 160. Block 610 may be followed by a transition to block 620.

In a "$V_E$ Modification and Thermal Communication with Heat Sink" block 620, the voltage $V_S$ may be forward biased to draw the electrocaloric material and electrodes 210 to the heat sink electrode 140. Simultaneously, the second voltage $V_E$ may be reversed biased to polarize of the electrocaloric material 110 until the electrocaloric material 110 reaches saturation polarization with low entropy, i.e., an ordered polarized state. Block 620 may be followed by a transition to block 630.

In a "Transition" block 630 the heat sink electrode 140 may be reverse biased and the cooling load electrode 160 may be forward biased with voltage $V_L$, which begins to draw the electrocaloric material 110 in its ordered state of low entropy to the cooling load electrode 160. Block 630 may be followed by a transition to block 640.

In a "Thermal Communication with Cooling Load" block 640 the electrocaloric material 110 in its ordered state of low entropy may contact the cooling load electrode 160 until thermal equilibrium is reached. Block 640 may be followed by a transition to block 650.

In a "$V_E$ Modification" block 650, a voltage $V_E$ may reduced or removed, leading to the depolarization of the electrocaloric material 110 to the disordered state of high entropy while drawing thermal energy from the cooling load 170. After the thermal equilibrium is reached, the voltage $V_S$ may again be applied in forward bias, which draws the electrocaloric material 110 in its disordered state of high entropy to the heat sink electrode 160. Block 650 may transition to block 620 and the thermal transfer cycle may begin again.

Embodiments according to FIG. 2, FIG. 5 and FIG. 6 may make use of the flexible nature of an electrocaloric polymer membrane to produce ECE based refrigeration. By electrically biasing the heat sink electrode 140, the cooling load electrode 160, and metal thin film electrode layers 120 and 130 in a sequence as shown in FIG. 6, the flexible ECE polymer membrane 110 can be capacitively driven to make cyclic mechanical and thermal contact between the cooling load 170 and the heat sink 150 via the electrodes 160 and 140, respectively.

In various embodiments described above, when cycling voltages between the heat sink electrode or the cooling load electrode and the thin film electrode layers, an electrocaloric material comprising a polymer membrane moves back or forth between the heat sink electrode and the cooling load electrode. When cycling voltages between the two thin film electrode layers 120 and 130, the ferroelectric order of the polymer membrane may be cycled into high and low entropy states capable of releasing and absorbing energy to or from the heat sink electrode 140 or the cooling load electrode 160. The sequence and direction of these biases can be applied in a manner that promotes the transfer of heat energy from the cooling load 170 to the heat sink 150. Based on the temperature changes of a given cooling load, the polarization bias dwell periods, membrane transferable times, and thermal contact dwell periods may range from about 1 second to about 10 minutes.

Figure 7:
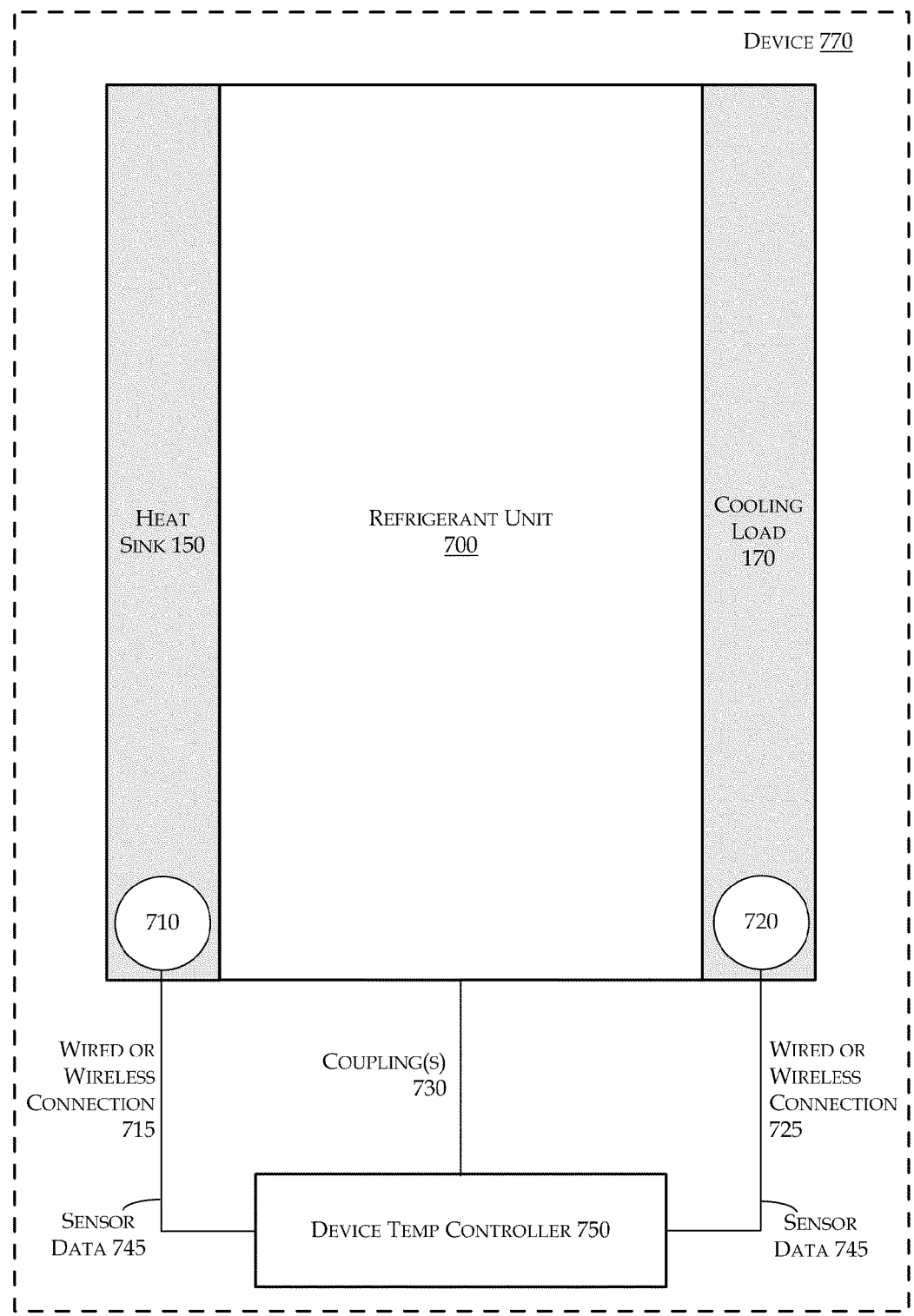
FIG. 7 illustrates a representative device incorporating a cooling system.

FIG. 7 illustrates a representative device incorporating a cooling system, arranged in accordance with at least some embodiments of the present disclosure. Device 770 may comprise a refrigerant unit 700, a heat sink 150, a cooling load 170, sensors 710 and 720, and a device temperature controller 750.

In FIG. 7, the refrigerant unit 700 may be disposed between the heat sink 150 and cooling load 170. Refrigerant unit 700 may be coupled with device temp controller 750 via one or more couplings 730. Sensors 710 and 720 may be disposed on the heat sink 150 and cooling load 170, respectively. Device temp controller 750 may be coupled with sensors 710 and 720 via wired or wireless connections 715 and 725, respectively, and sensor data 745 may be communicated from sensors 710 and 720 to device temp controller 750.

In some embodiments, a device temp controller 750 may be configured to receive sensor data 745 and to store the sensor data as an aspect of refrigerant unit data 326, described above. The device temp controller 750 may respond to sensor data 745 indicating cooling load 170 and/or heat sink 150 temperatures by increasing or decreasing a rate of cooling deployed by refrigerant unit 700. Cooling rate may be modified for example by increasing and/or decreasing time delay periods such as $T_1$, $T_2$, and $T_3$, described in connection with FIG. 5. Cooling rate may also be modified through modifications of the voltage levels employed for $V_S$, $V_L$, and $V_E$.

Cooling systems according to the present disclosure may be used with a variety of devices 770, including, for example, a computer system requiring microprocessor cooling, a refrigeration system for cooling food or other perishables, a cooling system for industrial equipment, and air conditioning systems for environmental cooling.

In embodiments configured for cooling a computing device, the cooling load 170 may comprise a semiconductor die to which the refrigerant unit 700 may be bonded, or otherwise in thermal communication. A semiconductor die may comprise for example a processor 310 and other components illustrated in FIG. 3. The heat sink 150 may comprise a heat spreader or ceramic chip carrier to which the refrigerant unit 700 may be bonded, or otherwise in thermal communication.

Refrigerant unit 700 may comprise any of the various cooling unit configurations described herein, and may be controllable by voltages applied via couplings 750, coupling the refrigerant unit 700 to the device temp controller 750. The device temp controller 750 may for example comprise combined voltage source 180 and controller 300 components.

In some embodiments, the electrocaloric refrigerant unit 700 may have a thickness of around 300 microns to provide a thin profile thermal management system. In other embodiments, a plurality of refrigerant units such as 700 could be formed in an array to cool various machine or electronics housings and Printed Circuit Board (PCB) card assemblies. In a properly configured system, the refrigerant unit 700 of the present disclosure could be positioned in critical "hot-spots" to enable more efficient operation. In a further embodiment, the refrigerant unit 700 can be arrayed to form food coolers, beverage coolers, refrigerator appliances, planar living space air conditioners (such as planar wall coolers), and home or industrial cold plates.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While certain example techniques have been described and shown herein using various methods, devices and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter also may include all implementations falling within the scope of the appended claims, and equivalents thereof.

The invention claimed is:

1. A cooling system, comprising:
    a refrigerant unit comprising:
        a layered electrocaloric membrane and electrode structure comprising an electrocaloric membrane intermediate a first electrode layer and a second electrode layer, wherein the electrocaloric membrane is adapted to polarize to a low entropy state in response to application of a polarization voltage across the first electrode layer and the second electrode layer, and wherein the electrocaloric membrane is adapted to depolarize to a high entropy state in response to removal of the polarization voltage;
        a heat sink;
        a heat sink electrode configured in thermal communication with the heat sink;
        a cooling load; and
        a cooling load electrode configured in thermal communication with the cooling load, wherein the layered electrocaloric membrane and electrode structure is suspended between the heat sink electrode and the cooling load electrode; and
    a bias source configured to bias the heat sink electrode to bring, by movement of the layered electrocaloric membrane and electrode structure within the refrigerant unit, the layered electrocaloric membrane and electrode structure into thermal communication with the heat sink electrode and out of thermal communication with the cooling load electrode in response to polarization of the electrocaloric membrane to the low entropy state such that heat transfer is promoted from the refrigerant unit to the heat sink, and configured to bias the cooling load electrode to bring, by movement of the layered electrocaloric membrane and electrode structure within the refrigerant unit, the layered electrocaloric membrane and electrode structure into thermal communication with the cooling load electrode and out of thermal communication with the heat sink electrode in response to depolarization of the electrocaloric membrane to the high entropy state such that heat transfer from the cooling load electrode to the heat sink electrode is promoted;
    wherein the layered electrocaloric membrane and electrode structure is a flexible structure, wherein movement of the layered electrocaloric membrane and electrode structure into thermal communication with the heat sink electrode comprises flexure of the electrocaloric membrane and electrode structure toward the heat sink electrode, and wherein movement of the layered electrocaloric membrane and electrode structure into thermal communication with the cooling load electrode comprises flexure of the electrocaloric membrane and electrode structure toward the cooling load electrode.

2. The cooling system of claim 1, wherein surfaces of the heat sink electrode and cooling load electrode comprise passivation layers, wherein the passivation layers are adapted to promote mechanical contact and thermal communication to the layered electrocaloric membrane and electrode structure and to provide dielectric separation during the mechanical contact.

3. The cooling system of claim 1, wherein surfaces of the layered electrocaloric membrane and electrode structure comprise passivation layers adapted to promote mechanical contact and thermal communication to the heat sink electrode and cooling load electrode and to provide dielectric separation during the mechanical contact.

4. The cooling system of claim 1, further comprising a passivation layer comprising one or more of beryllium oxide and/or aluminum nitride on one or more of the layered electrocaloric membrane and electrode structure, the heat sink electrode, and/or the cooling load electrode.

5. The cooling system of claim 1, wherein the electrocaloric membrane comprises a ferroelectric polymer.

6. The cooling system of claim 5, wherein the ferroelectric polymer comprises a polyvinylidenefluoride (PVDF) copolymer.

7. The cooling system of claim 1, wherein the bias source comprises a voltage source, and further comprising a controller adapted to control the voltage source.

8. The cooling system of claim 1, wherein the bias source comprises one or more of a hinge device, a spring device, a slide device, or a rotating device.

9. The cooling system of claim 1, wherein the cooling load comprises a semiconductor die.

10. The cooling system of claim 1, wherein the cooling load comprises an electronics packaging.

11. The cooling system of claim 1, wherein the cooling load comprises a refrigeration system.

12. The cooling system of claim 1, wherein the cooling load comprises an air conditioning system.

13. An enclosed cavity cooling device, comprising:
    a heat sink;
    a first cavity sidewall that includes a heat sink electrode, wherein the heat sink electrode is adapted in thermal communication with the heat sink;
    a second cavity sidewall, substantially parallel to the first cavity sidewall, the second cavity sidewall including a cooling load electrode, wherein the cooling load electrode is adapted in thermal communication with a cooling load;
    a first separator that includes a first suspension node;
    a second separator parallel to the first separator and including a second suspension node, wherein the first and the second separators are thermally and electrically insulative and adapted to separate the first cavity sidewall and the second cavity sidewall; and
    a layered electrocaloric membrane and electrode structure comprising an electrocaloric membrane intermediate a first electrode layer and a second electrode layer;
    wherein the electrocaloric membrane is adapted to polarize to a low entropy state in response to application of a polarization voltage across the first electrode layer and the second electrode layer, and to depolarize to a high entropy state in response to removal of the polarization voltage;

wherein the layered electrocaloric membrane and electrode structure is coupled to the first suspension node and the second suspension node to provide a structure suspended between the first cavity sidewall and the second cavity sidewall and to allow movement of the layered electrocaloric membrane and electrode structure into thermal communication with the first cavity sidewall and out of thermal communication with the second cavity sidewall, and to allow movement of the layered electrocaloric membrane and electrode structure into thermal communication with the second cavity sidewall and out of thermal communication with the first cavity sidewall; and wherein the layered electrocaloric membrane and electrode structure is a flexible structure, wherein movement of the layered electrocaloric membrane and electrode structure into thermal communication with the first cavity sidewall comprises flexure of the electrocaloric membrane and electrode structure toward the first cavity sidewall, and wherein movement of the layered electrocaloric membrane and electrode structure into thermal communication with the second cavity sidewall comprises flexure of the electrocaloric membrane and electrode structure toward the second cavity sidewall.

14. The enclosed cavity cooling device of claim 13, further comprising a voltage source configured to bias the heat sink electrode to bring the layered electrocaloric membrane and electrode structure into thermal communication with the first cavity sidewall in response to polarization of the electrocaloric membrane to the low entropy state such that heat transfer is promoted from the layered electrocaloric membrane and electrode structure to the heat sink, and wherein the voltage source is configured to bias the cooling load electrode to bring the layered electrocaloric membrane and electrode structure into thermal communication with the second cavity sidewall in response to depolarization of the electrocaloric membrane to the high entropy state such that heat transfer is promoted from the cooling load to the layered electrocaloric membrane and electrode structure.

15. The enclosed cavity cooling device of claim 14, further comprising a controller adapted to control the voltage source.

16. The enclosed cavity cooling device of claim 13, wherein an enclosed cavity formed by the first and second cavity sidewalls is evacuated of gaseous medium.

17. The enclosed cavity cooling device of claim 13, wherein the electrocaloric membrane comprises a ferroelectric polymer.

18. The enclosed cavity cooling device of claim 13, wherein the cooling load comprises a semiconductor die.

19. The enclosed cavity cooling device of claim 13, wherein the cooling load comprises an electronics package.

20. The enclosed cavity cooling device of claim 13, wherein the load comprises a refrigeration system.

21. The enclosed cavity cooling device of claim 13, wherein the cooling load comprises an air conditioning system.

22. A method to operate a cooling device, comprising:
biasing a heat sink electrode to bring a layered electrocaloric membrane and electrode structure into thermal communication with a heat sink and out of thermal communication with a cooling load by movement of the layered electrocaloric membrane and electrode structure within the cooling device, wherein the layered electrocaloric membrane and electrode structure comprises an electrocaloric membrane intermediate a first electrode layer and a second electrode layer;

wherein the layered electrocaloric membrane and electrode structure is a flexible structure, wherein movement of the layered electrocaloric membrane and electrode structure into thermal communication with the heat sink comprises flexing the electrocaloric membrane and electrode structure toward the heat sink, and wherein movement of the layered electrocaloric membrane and electrode structure into thermal communication with the cooling load comprises flexing the electrocaloric membrane and electrode structure toward the cooling load;

applying a polarization voltage across the first electrode layer and the second electrode layer to polarize the electrocaloric membrane to a low entropy state while maintaining the thermal communication between the layered electrocaloric membrane and electrode structure and the heat sink such that heat generated during the polarization is dissipated from the electrocaloric membrane to the heat sink;

biasing a cooling load electrode to bring the layered electrocaloric membrane and electrode structure into thermal communication with the cooling load and out of thermal communication with the heat sink by movement of the layered electrocaloric membrane and electrode structure within the cooling device; and removing the polarization voltage while maintaining the thermal communication between the cooling load and the layered electrocaloric membrane and electrode structure to allow the electrocaloric membrane to depolarize to a high entropy state and draw heat energy from the cooling load.

23. The method to operate a cooling device of claim 22, further comprising receiving one or more voltage control commands from a controller, the voltage control commands providing one or more timing and/or voltage levels to bias the heat sink electrode, apply the polarization voltage, bias the cooling load electrode, and/or remove the polarization voltage.

24. The method to operate a cooling device of claim 23, further comprising modifying timing and/or voltage levels in response to received voltage control commands to implement a cooling rate of the cooling load.

25. The method to operate a cooling device of claim 22, further comprising grounding the cooling load electrode and repeating the biasing the heat sink electrode, applying the polarization voltage, biasing the cooling load electrode, and/or removing the polarization voltage in a thermal transfer cycle.

26. A cooling system, comprising:
a heat sink;
a first electrode configured in thermal communication with the heat sink;
a second electrode configured in thermal communication with a cooling load;
an electrocaloric structure suspended between the first electrode and the second electrode, wherein the electrocaloric structure is adapted to polarize to a low entropy state in response to application of a polarization voltage across the first electrode and the second electrode, and wherein the electrocaloric structure is adapted to depolarize to a high entropy state in response to removal of the polarization voltage; and
a bias source that is adapted to bias the electrocaloric structure into alternative thermal communication with the first electrode and the second electrode by movement of the electrocaloric structure within the cooling system, wherein the electrocaloric structure is brought into thermal communication with the heat sink and out of thermal communication with the cooling load in response to polarization of the electrocaloric structure to the low entropy state such that heat transfer from the electrocaloric structure to the heat sink is promoted, and into thermal communication with the cooling load and out of thermal communication with the heat sink in response to depolarization of the electrocaloric structure to the high entropy state such that heat transfer from the cooling load to the electrocaloric structure is promoted;

wherein the electrocaloric structure is a flexible structure, wherein movement of the electrocaloric structure into thermal communication with the heat sink comprises flexure of the electrocaloric structure toward the heat sink, and wherein movement of the electrocaloric structure into thermal communication with the cooling load comprises flexure of the electrocaloric structure toward the cooling load.

27. The cooling system of claim 26, wherein the bias source comprises a voltage source.

28. The cooling system of claim 26, wherein the bias source comprises one or more of a hinge device, a spring device, a slide device, or a rotating device.

29. The method to operate a cooling device of claim 22, further comprising grounding the heat sink electrode while maintaining the polarization voltage prior to biasing the cooling load electrode to bring the layered electrocaloric membrane and electrode structure into thermal communication with the cooling load.

* * * * *

UNITED STATES PATENT AND TRADEMARK OFFICE
CERTIFICATE OF CORRECTION

PATENT NO.        : 8,695,353 B2
APPLICATION NO.   : 12/641153
DATED             : April 15, 2014
INVENTOR(S)       : Casasanta It is certified that error appears in the above-identified patent and that said Letters Patent is hereby corrected as shown below:

In the Drawings

In Fig. 6, Sheet 6 of 8, in Box "620", in Line 1, delete "MODIFICTATION" and insert
-- MODIFICATION --, therefor. (see attached)

In Fig. 6, Sheet 6 of 8, in Box "650", delete "MODIFICTATION" and insert -- MODIFICATION --,
therefor. (see attached)

In the Specification

In Column 17, Line 27, delete "and or" and insert -- and/or --, therefor.

Signed and Sealed this
Second Day of September, 2014

Michelle K. Lee
*Deputy Director of the United States Patent and Trademark Office*